(12) United States Patent
Blaschyk

(10) Patent No.: US 11,241,638 B2
(45) Date of Patent: Feb. 8, 2022

(54) CHROMATOGRAPHY COLUMN SUPPORT

(71) Applicant: Hoffmann-La Roche Inc., Nutley, NJ (US)

(72) Inventor: Andreas Blaschyk, Penzberg (DE)

(73) Assignee: Hoffmann-La Roche Inc., Nutley, NJ (US)

( * ) Notice: Subject to any disclaimer, the term of this patent is extended or adjusted under 35 U.S.C. 154(b) by 43 days.

(21) Appl. No.: 16/380,703

(22) Filed: Apr. 10, 2019

(65) Prior Publication Data

US 2019/0255462 A1 Aug. 22, 2019

Related U.S. Application Data

(63) Continuation of application No. 13/980,985, filed as application No. PCT/EP2012/051512 on Jan. 31, 2012, now abandoned.

(30) Foreign Application Priority Data

Feb. 2, 2011 (EP) .................................. 1153063

(51) Int. Cl.
*B01D 15/22* (2006.01)
*G01N 30/60* (2006.01)
*G01N 30/56* (2006.01)

(52) U.S. Cl.
CPC ............ *B01D 15/22* (2013.01); *G01N 30/56* (2013.01); *G01N 30/6047* (2013.01); *G01N 30/6069* (2013.01); *G01N 30/603* (2013.01); *G01N 30/6021* (2013.01); *G01N 2030/565* (2013.01)

(58) Field of Classification Search
None
See application file for complete search history.

(56) References Cited

U.S. PATENT DOCUMENTS

| | | |
|---|---|---|
| 3,298,527 A | 1/1967 | Wright |
| 3,374,606 A | 3/1968 | Baddour |
| 3,398,512 A | 8/1968 | Perkins et al. |

(Continued)

FOREIGN PATENT DOCUMENTS

| | | |
|---|---|---|
| EP | 0 005 708 A1 | 12/1979 |
| EP | 0 008 921 A1 | 3/1980 |

(Continued)

OTHER PUBLICATIONS

Stickel, et al. "Pressure-Flow Relationships for Packed Beds of Compressible Chromatography Media at Laboratory and Production Scale", Biotheohnol. Prog., 17 (2001), pp. 744-751.

(Continued)

*Primary Examiner* — Kara M Peo
(74) *Attorney, Agent, or Firm* — Norton Rose Fulbright US LLP; James R. Crawford

(57) ABSTRACT

Herein is reported the use of a chromatography column support comprising at least one plane of symmetry, one axis of symmetry, at least three legs, at least three straight connectors, whereby the connectors define a plane that is perpendicular to the axis of symmetry of the support, whereby the connectors are connected to each other at the axis of symmetry, whereby each leg is connected to a connector, whereby each leg is perpendicular to the plane defined by the connectors, whereby all legs are on the same side of the plane defined by the connectors for stabilizing the packing of a chromatography column.

2 Claims, 9 Drawing Sheets

(56) References Cited

U.S. PATENT DOCUMENTS

| | | |
|---|---|---|
| 3,453,811 A | 7/1969 | Greibach |
| 3,539,505 A | 11/1970 | Lauer et al. |
| 3,657,864 A | 4/1972 | Davis, Jr. et al. |
| 3,854,904 A | 12/1974 | Jamet |
| 4,259,186 A | 3/1981 | Boeing et al. |
| 4,351,621 A | 9/1982 | Liou |
| 4,710,289 A | 12/1987 | Wermuth et al. |
| 4,719,011 A | 1/1988 | Shalon et al. |
| 4,732,687 A | 3/1988 | Mueller et al. |
| 4,851,115 A | 7/1989 | Akao et al. |
| 5,124,133 A | 6/1992 | Schoenrock |
| 5,667,676 A | 9/1997 | Alaska |
| 5,677,424 A | 10/1997 | Rucheton et al. |
| 5,770,061 A | 6/1998 | Heikkila et al. |
| 5,866,008 A | 2/1999 | Shalon et al. |
| 6,281,336 B1 | 8/2001 | Laursen et al. |
| 6,352,266 B1 | 3/2002 | Rigoli |
| 6,440,301 B1 | 8/2002 | Dobos |
| 6,458,273 B1 | 10/2002 | Krakover et al. |
| 6,565,745 B2 | 5/2003 | Hodgin ............... B01D 15/22 210/198.2 |
| 6,583,272 B1 | 6/2003 | Bailon |
| 6,942,794 B2 | 9/2005 | Titus et al. |
| 7,138,120 B2 | 11/2006 | Laursen et al. |
| 7,258,060 B2 | 8/2007 | Dahl |
| 7,314,551 B2 | 1/2008 | Frey et al. |
| 7,780,853 B2 | 8/2010 | Davis et al. |
| 7,807,158 B2 | 10/2010 | Endl et al. |
| 8,864,997 B2 | 10/2014 | Davis et al. |
| 2003/0120045 A1 | 6/2003 | Ballon |
| 2003/0146159 A1 | 8/2003 | Guiochon |
| 2006/0108274 A1 | 5/2006 | Akao et al. |
| 2006/0118471 A1 | 6/2006 | Vidalinc |
| 2008/0099402 A1 | 5/2008 | Witt et al. |
| 2009/0230045 A1 | 9/2009 | Kaneko et al. |
| 2010/0276370 A1 | 11/2010 | Davis et al. |
| 2011/0086026 A1 | 4/2011 | Endl et al. |
| 2012/0123091 A1 | 5/2012 | Blaschyk et al. |
| 2015/0001775 A1 | 1/2015 | Davis et al. |

FOREIGN PATENT DOCUMENTS

| | | |
|---|---|---|
| EP | 0 176 891 A2 | 4/1986 |
| EP | 1 064 951 A2 | 1/2001 |
| EP | 1 606 615 B1 | 8/2006 |
| EP | 1 892 526 A1 | 2/2008 |
| EP | 1 916 522 A1 | 4/2008 |
| GB | 1 203 439 | 8/1970 |
| JP | 62-042051 A | 2/1987 |
| JP | 64-18438 A | 1/1989 |
| JP | H04-193353 A | 7/1992 |
| JP | H10-506470 A | 6/1998 |
| JP | 3159609 B2 | 2/2001 |
| JP | 2001-330598 A | 11/2001 |
| JP | 2006-512569 A | 4/2006 |
| JP | 2006-307993 A | 11/2006 |
| JP | 2007-256226 A | 10/2007 |
| JP | 2008-212889 A | 9/2008 |
| JP | 2008-241624 A | 10/2008 |
| RU | 2009482 C1 | 3/1994 |
| WO | 91/14490 A1 | 10/1991 |
| WO | 96/10451 A1 | 10/1991 |
| WO | 00/10675 A1 | 3/2000 |
| WO | 2006/048514 A1 | 5/2006 |
| WO | 2006/072564 A1 | 7/2006 |
| WO | 2011/012296 A1 | 2/2011 |

OTHER PUBLICATIONS

Vijayalakshmi M.A. "Antibody Purification Methods", Applied Biochem. and Biotechnol., 75 (1998), pp. 93-102.
Bird, et al. "Single-Chain Antigen-Binding Proteins", J. Science 242 (1988), pp. 423-426.
Tanaka, et al. "High quality human immunoglobulin G purified from Cohn fractions by liquid chromatography" Brazilian J. of Medical and Biological Research, 33(1), (2000), pp. 27-30.

A chromatography column support which allows a movable fit to be positioned within a chromatography column at a desired position. The support comprises a multitude of legs and a multitude of connectors connected to the upper end of the legs providing a support over the entire diameter of the column for a movable frit.

CHROMATOGRAPHY COLUMN SUPPORT

This application is a continuation of U.S. patent application Ser. No. 13/980,985 filed Jul. 22, 2013, which is a § 371 of International Application No. PCT/EP2012/051512 filed Jan. 31, 2012, and claims priority from European Patent Application No. 11153063.0 filed Feb. 2, 2011, each of which is incorporated herein by reference in its entirety for all purposes.

Herein is reported a chromatography column support which allows a movable fit to be positioned within a chromatography column at a desired position. The support comprises a multitude of legs and a multitude of connectors connected to the upper end of the legs providing a support over the entire diameter of the column for a movable frit.

BACKGROUND OF THE INVENTION

The design of large-scale preparative chromatographic processes can be very complex and can involve many factors that are not primarily "chromatographic". These factors include method of column packing, hydrodynamic pressure drop, and flow distribution. These ultimately factor into the economics of the process.

Stickel, J. J. and Fotopoulos, A. (Biotechnol. Prog. 17 (2001) 755-751) report pressure-flow relationships for packed beds of compressible chromatography media at laboratory and production scale.

For gel filtration columns at technical scale the problem of compaction of the gel filling resulting in a reduced capacity can be avoided by the arrangement of separation walls inside the chromatography column with a direction parallel to the wall of the column as reported in EP 0 005 708.

In EP 0 176 891 a column for high pressure chromatography is reported comprising additional support elements for the stabilization of the column packing.

In U.S. Pat. No. 3,398,512 a chromatographic column is reported. The chromatography apparatus as reported therein comprises a column of the type having a gas inlet, a gas outlet, at least one column wall interconnecting the gas inlet and gas outlet and confining solid particulate packing material, and means for preventing and reducing component profile distortion by straightening or reshaping component profiles after they have sustained distortion.

In U.S. Pat. No. 5,770,061 it is outlined that by providing chromatography columns with plates which are permeable to the liquid flow but carry the filling material, the filling material can be divided into several superimposed layers, thus diminishing the pressure difference over the total height of the filling material (see e.g. GB 1,203,439, U.S. Pat. No. 3,539,505). Attempts have also been made to eliminate the disadvantages of large columns by means of various walls disposed in the column and having the direction of the vertical axis of the column. These walls divide the column into several parallel sections of a smaller cross-section, said sections extending continuously throughout the filling bed or throughout the almost entire bed (see e.g. EP 0 005 708, U.S. Pat. Nos. 5,124,133, 3,298,527).

In WO 91/014490 a slurry compressor is reported that facilitates obtaining a homogeneous absorbent bed packing in liquid chromatography columns, thus improving the efficiency of the columns and increasing the accuracy of the results obtained thereby.

In U.S. Pat. No. 6,440,301 an apparatus which facilitates the use of standard sized and configured laboratory glassware as chromatography column is reported. It is also reported a stainless matrix holder, the holder defining a central opening and further defining a circumferential, reduced diameter grooved engaged by a gasket such as an O-ring.

In U.S. Pat. No. 3,374,606 is reported a method and apparatus for chromatographic separations comprising sieve plates that may be arranged in any sequence or position within the packed bed or separatory material in a chromatography column, thereby separating the column into a series of separatory zones.

It has been reported in U.S. Pat. No. 5,770,061 that the capacity and separation result of large separation columns can be markedly improved by arranging in the column an inner structure which is light, self-supporting and easy to install in the column. In more detail it is reported a separation column which is characterized in that its filling material space comprises in the vertical direction at least two zones between which no means that would hinder vertical flow exist and which are divided by means of substantially vertical walls into separate sections, the zones being so dimensioned that the upper edge of the walls in the uppermost zone is below the upper surface of the column filling material in the operating conditions of the column.

In U.S. Pat. No. 4,351,621 a connector for combination furniture is reported. A high velocity chromatography column flow distributor is reported in EP 1 606 615. In JP 2008-241 624 a chromatography column-use liquid introducing unit is reported. A chromatography device is reported in JP 62-042051.

SUMMARY OF THE INVENTION

One aspect as reported herein is a chromatography column support comprising
   at least one plane of symmetry,
   a single axis of symmetry,
   at least three legs,
   at least three straight connectors,
   whereby the connectors form a plane that is perpendicular to the axis of symmetry of the support,
   whereby the connectors are connected to each other at the axis of symmetry or at a circle around the axis of symmetry,
   whereby each leg is connected to a connector,
   whereby each leg is perpendicular to the plane formed by the connectors,
   whereby all legs are on the same side of the plane formed by the connectors.

In one embodiment the legs are plates comprising a multitude of holes. In a further embodiment the support comprises three legs and one connector, whereby the connector is Y-shaped. In also an embodiment the support comprises at least four legs and at most sixteen legs and comprises four connectors.

In one embodiment at least one of the connectors and one of the legs are combined in one unit. In one embodiment each of the connectors is combined with a leg in a unit.

In one embodiment the chromatography column support comprises more legs than connectors.

In one embodiment the chromatography column support comprises
   at least three legs that each form a unit with a connector,
   at least three legs that do not form a unit with a connector,
   at least one leg that is circular around the axis of symmetry.

In one embodiment the chromatography column support is a single entity.

In one embodiment the chromatography column support comprises multiple entities.

In one embodiment the connectors have a width of less than 8.0 mm.

In one embodiment the chromatography column support has a diameter of less than 12.5 cm.

In one embodiment the chromatography column support is made of stainless steel, or silicone, or polytetrafluoroethylene, or glass.

Another aspect as reported herein is a device comprising
a chromatography column,
at least one movable frit, and
at least one support as reported herein,
wherein the moveable frit and the chromatography column support are inside the chromatography column, and
whereby the moveable fit is above the chromatography column support, when the chromatography column is placed vertically and viewed from the side.

Another aspect as reported herein is the use of a chromatography column support as reported herein for the stabilization of a chromatography column packing from inside the packing.

DETAILED DESCRIPTION OF THE INVENTION

Herein is reported a chromatography column support comprising
one axis of symmetry,
at least one plane of symmetry that is perpendicular to the axis of symmetry,
at least three legs that are perpendicular to the plane of symmetry,
at least three straight connectors,
whereby the connectors define the plane of symmetry that is perpendicular to the axis of symmetry of the support,
whereby the connectors are connected to each other at or around the axis of symmetry,
whereby each leg is connected to a connector,
whereby each leg is perpendicular to the plane defined by the connectors,
whereby all legs are on the same side of the plane defined by the connectors,
whereby the plane defined by the connectors is not solid.

It has been found that the contact interface between the moveable frit placed upon the chromatography column support and the chromatography column, in which the device is placed, shall not interfere with the properties of the supported moveable frit.

It has been found that for the construction of the chromatography column support it has to be accounted for the fact that it is placed within the chromatography material and, thus, it is surrounded by it. Thus, the chromatography column support is constructed in a way to minimize the disturbance of the chromatography material during the column packing process. Additionally it is constructed in a way to minimize the disturbance of the mobile phase flowing though the chromatography material during a chromatographic separation process.

It has been found that the chromatography column support as reported herein can be made as a single piece (e.g. by casting the molded material in a casting mold) or from multiple pieces (e.g. by connecting the pieces together, such as screwing or bonding).

The chromatography column support as reported herein is not affixed to the chromatography column. It can be removed from the column without the need to first detach it from the column.

The chromatography column support as reported herein supports the chromatography column packing inside the packing. In contrast thereto, chromatography columns as well as top and/or bottom plates inside the chromatography column support the chromatography column packing from the outside. The chromatography column support as reported herein forms a framework inside the chromatography column packing. This framework supports the stability and homogeneity of the chromatography material packing from inside the packing. In contrast a common chromatography column supports the chromatography material packing only from the outside.

Thus, a chromatography column packing comprising a chromatography column support as reported herein has improved stability compared to a chromatography column packing in a conventional chromatography column without the chromatography column support as reported herein.

The term "one connector and one leg are combined in one unit" denotes that the presence of an additional connector is obsolete as the leg has the same length as the connector and is connected to other legs/connectors at or around the axis of symmetry.

In a liquid column chromatography purification method the chromatography material is located within a column housing (chromatography column) and denoted as "stationary phase". To enable a stationary phase to interact with substances/polypeptides in a solution applied to it, the stationary phase is surrounded by/embedded in a "mobile phase". The term "mobile phase" denotes a liquid, e.g. a buffered, aqueous solution, a mixture of water and an organic solvent, or an organic solvent, which is used in the chromatographic purification method in which a stationary phase is employed.

Different chromatography methods are well established and widespread used for polypeptide recovery and purification, such as affinity chromatography with microbial proteins (e.g. protein A or protein G affinity chromatography), ion exchange chromatography (e.g. cation exchange (carboxymethyl resins), anion exchange (amino ethyl resins) and mixed-mode exchange), thiophilic adsorption (e.g. with beta-mercaptoethanol and other SH ligands), hydrophobic interaction or aromatic adsorption chromatography (e.g. with phenyl-sepharose, aza-arenophilic resins, or m-aminophenylboronic acid), metal chelate affinity chromatography (e.g. with Ni(II)- and Cu(II)-affinity material), size exclusion chromatography, and electrophoretical methods (such as gel electrophoresis, capillary electrophoresis) (see e.g. Vijayalakshmi, M. A., Appl. Biochem. Biotech. 75 (1998) 93-102).

In a column chromatography separation or purification of a crude polypeptide normally a chromatography column comprising a chromatography material and a mobile phase is employed. The mobile phase is forced through the chromatography column and therewith through the chromatography material by applying pressure to the mobile phase. Mediated by the mobile phase the pressure is also applied to the chromatography material whereby a pressure drop from the inlet of the chromatography column to the outlet of the chromatography column is established. At the outlet of the chromatography column the pressure has dropped to the outside atmospheric pressure. Thus, to the upper fraction of the chromatography material in the chromatography column the highest pressure force is applied.

The applied pressure normally depends on the one hand on the particle size of the chromatography material as well as on the viscosity of the mobile phase as a constant flow through the chromatography column is set but not a constant pressure. Generally the pressure increases with decreasing chromatography material particle size. At a constant flow rate through the chromatography material a change in viscosity of the mobile phase, e.g. during the regeneration or cleaning of the chromatography material, results in a change of the pressure applied to the chromatography material. The chromatography material in general is not a pressure insensitive material, i.e. it can be compressed and expands after a compression. Therefore, with an increase of the applied pressure the chromatography material is compressed and the height of the chromatography material inside the chromatography column, i.e. the bed height, is reduced. Likewise with a decrease of the applied pressure the chromatography material expands again and the height of the chromatography material inside the chromatography column increases at most to the height before the application of the pressure. This compression and expansion of the chromatography material is at the same time a macroscopic process of the entire chromatography material and a microscopic process of the individual particles of the chromatography material. With increasing numbers of such compression-expansion-cycles the particles of the chromatography material break down into smaller particles. With decreasing particle size of the particles of the chromatography material the chromatography material packing gets more compact and, therewith, at the same time the pressure required for maintaining a constant liquid phase flow through the chromatography column, i.e. the chromatography material, increases. This in turn again results in a further break down of the chromatography material particles resulting again in an increased pressure and so on.

A chromatography column separation generally can be operated up to a maximum pressure. When this upper pressure limit is reached the chromatography column packing has to be replaced in its entirety.

The chromatography column support as reported herein provides for a number of advantages.

The support as reported herein is movable within the column, i.e. it can be placed anywhere along the axis of the column. Thus, the height of the support and therewith the height of the corresponding horizontal section of the chromatography column is variable and can be adjusted to the properties of the chromatography material used with the support. Additionally, as the support is movable within the column damage to the inner wall of the chromatography column is prevented.

The support as reported herein can be made of any material that can be used in column chromatography, such as Teflon (polytetrafluoroethylene), stainless steel, silicone, or glass. In one embodiment the chromatography column support as reported herein is made of polytetrafluoroethylene or stainless steel or silicone or glass. This allows for the provision of an inert support that does not interfere or interact with the chromatography material (column packing) as well as the substances to be separated. In one embodiment the chromatography column support is made of a chromatographically inert material.

Because the support as reported herein is not affixed to the chromatography column the support can be applied to and also removed from the column in an easy way. Additionally because the support is removable from the column it can be easily and efficiently cleaned and sanitized. In one embodiment the chromatography column support in the device as reported herein is freely moveable within the chromatography column. In one embodiment the chromatography column support in the device as reported herein is within the chromatography column but not affixed to the inner wall of the chromatography column.

Further, with the support as reported herein it is possible to provide a flexible, generally applicable addition to existing chromatography columns. Therewith the costs required to expand the applicability of existing chromatography columns are reduced.

The support as reported herein can be provided in many different variations in diameter and height and is therewith applicable to a multitude of different chromatography columns. But the diameter of the chromatography column support as reported herein is always less than the inner diameter of the chromatography column in order to ensure a free movability inside the column either during the packing of the column and/or the use of the column.

If the legs of the support are in the form of a plate an additional stabilization effect of the chromatographic material can be provided. In this embodiment the legs and the connectors form a single unit and, thus, the chromatography column support comprises at least three legs that are connected to each other at or around the axis of symmetry.

Generally the support as reported herein can be used in combination with a movable frit. In this combination the support can provide a stabilizing effect throughout the entire chromatography material inside the column.

The support as provided herein improves the packing process as a homogeneous packing of the chromatography material can be effected already prior to the application of the support. After the use of the column (single-use column) or when the chromatography material has to be replaced (multi-use column) the support can easily be removed with the chromatography material, just as with a column not comprising a support as reported herein. It is also possible to make the packing process with the support as reported herein already introduced into the respective horizontal section of the chromatography column.

It has been found that the support as reported herein can be used with any chromatography column giving the chromatography material therein an inner structure and support without the need to modify the chromatography column.

Thus, one aspect as reported herein is the use of a chromatography column support as reported herein for supporting chromatography material in a chromatography column.

In one embodiment is the support made of stainless steel, or silicone, or polytetrafluoroethylene, or glass.

In one embodiment the support comprises
  at least one plane of symmetry,
  one axis of symmetry,
  at least three legs,
  at least three straight connectors,
  whereby the connectors define a plane that is perpendicular to the axis of symmetry of the support,
  whereby the connectors are connected to each other at or around the axis of symmetry,
  whereby each leg is connected to a connector,
  whereby each leg is perpendicular to the plane defined by the connectors,
  whereby all legs are on the same side of the plane defined by the connectors.

In one embodiment the legs are plates and that the connectors and the legs form a unit in which the upper edge of the respective leg is the connector.

In one embodiment the legs are perforated plates.

In one embodiment the support comprises one or more circular legs that have different radii with respect to each other and with respect to the axis of symmetry.

In one embodiment a lateral flow between the sections defined by the legs of the support is possible.

Advantageous is further the unique symmetric structure of the support, especially when made of an inert material.

By the open architecture of the support, i.e. due to the absence of a permanent fixation to the inner chromatography column wall the chromatography material is provided with an inner structure without introducing compartments that are tightly closed to other compartments inside the column. By the open structure (i) the packing of the chromatography material can be obtained in a more homogeneous form, (ii) the formation of tension inside the packing can be prevented, (iii) flow and mass transport is ensured over the entire cross-section of the chromatography column, (iv) an easy packing and de-packing process is possible. Thus, one aspect as reported herein is the use of a chromatography column support as reported herein for providing an inner structure to a chromatography material in a chromatography column.

Furthermore the supported packing region can be from the bottom of the column up to the top without any non-supported areas in between or above or below the chromatography material packing.

Additionally each of the horizontal sections provided by a combination of a support as reported herein and a movable fit can be packed individually enabling the packing of a chromatography column from the bottom to the top. In addition in each horizontal section a different chromatography material can be introduced, thus, providing a means for a so called hybrid-chromatography.

In combination with a movable frit the support as reported herein provides for a vertical as well as horizontal supportation of the chromatography material inside the chromatography column. Thus, one aspect as reported herein is the use of a chromatography column support as reported herein for providing vertical and horizontal support of the chromatography material inside a chromatography column.

Thus, the support as reported herein provides a means for using the currently used chromatography columns in a more flexible way and at the same time minimizing the costs associated with flexibility as only the novel support has to be added.

FIG. 1A shows one embodiment of the support as reported herein which has four legs in the form of planes (full areas) is shown. In this embodiment the legs and the connectors are combined in a single unit and the support does not comprise additional connectors. The upper edge of the leg corresponds to the connector. The planes of the legs are in a 90° angle to each other and to the plane defined by the upper edges of the legs (i.e. the connectors). The diameter of the support and the outer area of the legs (i.e. the outer edge of the legs which is the edge in the direction of the column and perpendicular to the plane defined by the upper edges/connectors) can be adapted to any column diameter, so that the support can be introduced and removed into any column without friction and damaging the inner surface of the column. The height of the support as reported herein is variable and can be adjusted to the specific application. The bottom area of the support can be adapted to the base on which the support is to be placed. The base is a frit in most cases. The base supports the support and carries his weight without the column wall being involved. The upper area of the chromatography column support is formed in a way that either it is suitable as a base for a moveable column frit (moveably chromatography column separator) or the upper adapter of the column can be put thereon. It is therefore ensured that the complete packing is stabilized by the support as reported herein. Thus, one aspect as reported herein is the use of a support as reported herein to stabilize the packing of a chromatography column. If a moveable column separator is used, another support, optionally in a different form, can be put on the separator at most until the maximum column length reached. However, it also possible that only a part of the chromatography column packing is equipped with the support as reported herein.

FIG. 1B shows an embodiment of the support as reported herein is shown. This support comprises six legs each in form of a plane which are divided up symmetrically. The upper edge of each of the six legs represents the six connectors with which the legs form a unit in this embodiment. The legs are attached to each other at a circle around the axis of symmetry of the support. The pressure expected inside a column and the function of the support which is demanded determines the number of legs. These are dependent on the used chromatography medium and the process conditions.

FIG. 2A shows an embodiment of the support as reported herein is shown. In this embodiment the legs are in the form of a plane and form a unit together with the connectors which are represented by the upper edges of each of the legs. Characteristic for this embodiment are the longish openings in the planes of the legs of the support. This form offers an improved support for the chromatographic material and is especially suited for soft gels. Thus, one aspect as reported herein is the use of a chromatography column support as reported in this embodiment for stabilizing the packing of soft chromatography gels. Without being bound by theory it is assumed that the chromatographic material can find more support/contact area in the narrow rooms. The load and the pressure are absorbed by the support and passed on to the lower layers of the column packing in reduced form. Thus, one aspect as reported herein is the use of a chromatography column support as reported herein for adsorbing pressure inside a chromatography column packing. Another characteristic of this embodiment is the crossways networking which is obtained. A lateral flow between the individual sections made up by the legs of the support is therefore possible. Thus, in one embodiment of the support as reported herein a lateral flow between the individual sections defined by the legs of the support and the axis of symmetry of the support is possible. This should provide an improved mass transfer and column performance. The homogeneity of the packet during the column life also remains unchanged. The appearing tensions spread out better in column bed, which is only partly interrupted.

FIG. 2B shows a specific embodiment of the support as reported herein is shown. In this embodiment the legs are in the form of a perforated plate. Also in this embodiment each of the connectors forms a single unit with the individual legs. In this embodiment some of the legs are connected to each other at the axis of symmetry of the support. In this embodiment the support comprises additional legs that are not connected to each other around or at the axis of symmetry. This support is characterized by the fact that holes inside the planes of the legs of the support provide the crossways networking. In this embodiment the legs are made of perforated plates. In this embodiment the support further comprises at least two, especially three, circular legs (and round connectors) that all have different radii with respect to the axis of symmetry of the support. Thus, in one embodiment a first number of legs (the connectors) is connected to each other at the axis of symmetry of the support and all legs (connectors) are connected to each other by the circular legs (round connectors) of the support. In one embodiment the support comprises three circular legs (round connectors), whereby the first circular leg (round connector) has a radius with respect to the axis of symmetry of the support of one sixth of the total diameter of the support, the second circular leg (round connector) has a radius of one third of the total diameter of the support, and the third circular leg (round connector) has a radius of half the total diameter of the support. All legs are also connected to each other with the further round connectors. The relationship of the free areas and the wall spaces in this embodiment is different from that in the before outlined embodiments. In this case more sections result for the packing here, what can be beneficial for large column diameters. Thus, one aspect as reported herein is the use of a connector comprising circular legs and perforated plates as legs for stabilizing the column packing of large diameter chromatography columns. The term "large diameter chromatography column" denotes a chromatography column with an inner diameter of 15 cm or more.

FIG. 2C shows an exemplary embodiment of the support as reported herein is shown. Herein the support is shown inside a chromatographic column. The column comprises a support as reported herein and a moveably chromatography column frit placed thereon. These elements are flexible and not permanently connected to the column wall or other column components or to each other. In this embodiment the support comprises three legs in form of a rod and three connectors connected to each other at the axis of symmetry of the support.

In FIG. 3 an exemplarily chromatographic column which is equipped with several different supports as reported herein is shown. The column in addition comprises a number of moveable chromatography column separators. The column wall offers only the guidance for the supports and the moveable column separators which glide along the chromatography column wall while they are moved. The column wall does not have to be modified. None of the elements is permanently connected or affixed to the column wall. Such a column can also be packed with different chromatographic materials in the individual horizontal sections made up of a pair of support and separator. Thus, one aspect as reported herein is the use of a support as reported herein and a moveable frit to define horizontal sections in a chromatography column. The composition of all the used elements can be changed very simple and every time. Unpacking the column can be carried out in a conventional way. The used supports and moveable chromatography column separators can simply be removed from the column together with the column packing. All used equipment parts can independently of each other be cleaned or partly replaced.

In FIG. 4 a pressure flow diagram of a chromatography column comprising a DEAE-Sepharose chromatographic material is shown. The left curve shows the typical behavior of a DEAE-Sepharose chromatographic material in columns which are packed in a conventional way. In the right curve the behavior of a column equipped with two supports as reported herein and two chromatographic column separators is shown. It can be seen that the maximum flow rate of the conventionally packed column is less than half of the flow rate which has been achieved with the column comprising a support as reported herein (24 l/h instead of 55 l/h). It can be seen that a triple decompression takes place (from 1.5 bar to 0.5 bar) in the flow area of 22 l/h which represents a typical process flow (details of the column without a support as reported herein: 4 l slurry of DEAE Sepharose, bed height: 24 cm; used eluent: 0.0005 mol (conductivity 5 mS) KCl solution; details of the column comprising a support as reported herein: height of the used support: 8 cm, strength of the used separator: 5 mm, 4 l slurry of DEAE Sepharose distributed on three compartments, bed height: 24 cm, used eluent: 0.0005 mol (conductivity 5 mS) KCl solution).

In FIG. 5 a pressure flow diagram of a chromatography column comprising an HA-Ultrogel chromatographic material is shown. The left curve shows the typical behavior of HA-Ultrogel in columns which are operated without a support as reported herein. In the right curve the behavior of a column comprising two supports as reported herein and two moveable chromatographic column separators is shown. It can be seen that the maximum flow of the column without the support as reported herein is less than the flow rate of the column comprising a support as reported herein (8 l/h instead of 15 l/h) (details of the column without a support as reported herein: 4 l slurry of HA-Ultrogel, bed height: 24 cm; used eluent: 0.0005 mol (conductivity 5 mS) KCl solution; details of the column comprising a support as reported herein: height of the used support: 8 cm, strength of the used separator: 5 mm, 4 l slurry of DEAE Sepharose distributed on three compartments, bed height: 24 cm, used eluent: 0.0005 mol (conductivity 5 mS) KCl solution).

Thus, another aspect as reported herein is a device comprising a chromatography column,
at least one movable chromatography column separator, and
at least one support as reported herein.

In one embodiment the device comprises two chromatography column separators and two supports as reported herein. In another embodiment the device comprises three chromatography column separators and three supports as reported herein. In another embodiment the separator and the support both have an outer diameter that is less than the inner diameter of the chromatography column. In also an embodiment the diameter of the support and the separator is of from 90% to 99% of the inner diameter of the chromatography column. All the embodiments of the support as reported herein and outlined above are also embodiments of the supports comprised in the device as reported herein. Specific embodiments of the separators comprised in the device as reported herein are outlined below.

The presence of one chromatography column separator divides the chromatography column in an upper chromatography column chamber and a lower chromatography column chamber. The separator has a variable position within the chromatography column. This "movability" is provided for by a guide ring. Thus, the separator can slide vertically within the column and the separator is embedded in the chromatography material.

A chromatography column separator consisting of a guide ring and a frit mounted therein does not interfere with the chromatographical separation process. The separator allows e.g. that only a fraction of the chromatography material has to be exchanged when the maximum operating pressure is reached, without the need to replace the entire chromatography column packing. That is, the chromatography column separator permits that the chromatography material in an upper chromatography column chamber can be exchanged without interfering with the chromatography material in a lower chromatography column chamber. The partial removal of the chromatography material is possible as the separator on the one hand divides the total chromatography material in the chromatography column in distinct fractions and on the other hand prevents the packed chromatography material in the lower chromatography column chamber from being perturbed upon the removal of the chromatography material in the upper chromatography column chamber. Thus, at least the fraction of the chromatography material that is not exposed to the maximum pressure changes and, thus, is not torn up can be used further without a negative impact on the separation efficiency. But, by retaining a fraction of the chromatography material a cost of goods reduction can be achieved.

The chromatography column separator comprises a guide ring into which a frit made of any inert material can be mounted. An "inert material" is a material that does not interfere with the chromatography separation process, i.e. a chromatogram obtained with a chromatography column containing one or more chromatography column separators as reported herein is identical to a chromatogram obtained with a chromatography column containing no chromatography column separators under/with otherwise identical conditions. Such inert materials are e.g. metal, especially stainless steel, silicone, polypropylene, polyethylene, polytetrafluoroethylene, sintered materials or combinations thereof, especially polytetrafluoroethylene coated stainless steel.

In FIG. 6 exemplary chromatography column separators are shown. In FIG. 6A a separator with a single frit is depicted comprising a frit (1) and a fitting (2). In FIG. 6B a separator with an upper frit (3) and a lower frit (4) and a fitting (2) is shown. In FIG. 6C the vertical cross-section of the guide ring of the separator comprising two axially symmetric cross-section areas (5 and 6) is shown, wherein each of the axially symmetric cross-section areas has a) a tapering structure, wherein the tapering is from the outside to the inside of the guide ring, and b) a notch (8) with an opening directed to the inside of the guide ring for mounting a frit.

In one embodiment the chromatography column separator comprises a guide ring and a frit mounted into the guide ring.

In one embodiment the guide ring is of circular shape and for use in a liquid chromatography column. In another embodiment the guide ring has a vertical cross-section comprising two axially symmetric cross-section areas (5 and 6), wherein each of the axially symmetric cross-section areas has a) a tapering structure, wherein the tapering is from the outside to the inside of the guide ring, and b) a notch (8) with an opening directed to the inside of the guide ring for mounting a frit.

In one embodiment the notch is a rectangular notch. In a further embodiment each of the cross-section areas has a triangular shape and the longest side (7) has a length of at least 1.5 times the diameter of the notch (8). In a further embodiment the ring is made of rubber, plastic, silicone, polytetrafluoroethylene, polyethylene, or polypropylene.

In one embodiment the frit is a) a single frit, or b) two frits with an upper frit and a lower frit.

In another embodiment a) the frit has a pore size of from 1 µm to 20 µm, or b) each of the frits has a pore size of from 1 µm to 20 µm independently of each other whereby the pore size of the upper frit is smaller than the pore size of the lower frit. In another embodiment the frit is made of metal, silicone, polypropylene, polyethylene, polytetrafluoroethylene, sintered materials or combinations thereof. In a further embodiment the separator comprises distance holders all attached to one side of the separator.

In one embodiment the chromatography column separator is characterized in that a) the separator separates a chromatography column section in an upper chromatography column chamber and a lower chromatography column chamber, and b) the separator has a variable position within the chromatography column by sliding along the inner wall of the chromatography column.

In one embodiment the chromatography column separator comprises one frit, in another embodiment the separator comprises an upper frit and a lower frit. In a further embodiment the chromatography column separator or the upper frit or the lower frit has a pore size of from 1 µm to 20 µm, whereby the pore size of the upper frit is smaller than the pore size of the lower frit. In another embodiment the frit is made of metal, silicone, polypropylene, polyethylene, polytetrafluoroethylene, sintered materials or combinations thereof.

The fitting or guide ring has a circular shape with a cross-section that can have any shape as long as it has a rectangular notch for taking up the frit. For example, in one embodiment the cross-section of the fitting has the shape of a triangle with a rectangular notch for taking up the frit in the corner of the triangle with the biggest inside angle. In a further embodiment the fitting or guide ring has the cross-section or provides cross-sectional areas in form of a triangle, in another embodiment of a rectangular triangle, wherein the frit is attached to the corner of the triangle with an inner angle of 90°. In another embodiment the cross-section area of the guide ring has a trapezoid from with the rectangular notch for taking up the frit being at the shorter side of the parallel sides. In one embodiment the fitting has the form of a rectangle, in another embodiment of a rectangle with inner angles of 90°, 90°, 80° and 100°. In one embodiment are the inner angles of 80° and 100° are at the upper side or at the bottom side of the rectangle. In one embodiment the longest side of the guide ring is the outer edge of the separator and has contact to the chromatography column wall when the separator is placed inside a chromatography column. In another embodiment the longest side has a vertical orientation. In still another embodiment the cross-section areas of the fitting or guide ring have the form of a rectangle with inner angles of 90° with the rectangular notch for taking up the frit in one of the shorter sides or in case of a square in one of the sides. The side with the notch is the side of the fitting directing to the center of the separator and likewise the chromatography column or in other words the notch is in the side of the fitting or guide ring that is parallel to the flow direction of the mobile phase and that has a diameter smaller than the outer diameter of the frit. The guide ring has besides the preventing of liquid phase and chromatography material particles passing the separator beside frit the function to prevent the canting and therewith stalling of the entire separator in the chromatography column during the compression and expansion of the chromatography material upon the applying of the outside pressure. The separator is placed inside the chromatography material packed into a chromatography column. The separator can be moved freely and placed exactly inside the column as it can slide along the inner wall of the chromatography column. This is useful during the packing of the chromatography column and for removing the separator from the chromatography column. In one embodiment the vertical cross-sectional areas of the guide ring have the form of a triangle or trapezoid in which the guide ring has a tapering structure, wherein the tapering is from the outside to the inside of the guide ring, that is the guide ring is at its outer edge higher than at its inner edge or at the notch, respectively. In one embodiment the outer edge of the guide ring has a height that is at least 1.5 times the height of the notch. In another embodiment the outer edge of the guide ring has a height that is at least 1.5 times, or two times, or three times, or more than three times the height of the notch.

If the separator comprises an upper frit and a lower frit in one embodiment the fitting or guide ring is a single fitting or ring and in another embodiment the fitting or guide ring is made of an upper fitting or ring and a lower fitting or ring. In the latter case the two fittings or rings have in one embodiment a contact-area comprising the lower side of the upper fitting or ring and the upper side of the lower fitting or ring, whereby the contact sides are flat, i.e. have no notch or groove, and are in line with the lower side of the upper frit and the upper side of the lower frit, i.e. the lower side of the upper fitting and the lower side of the upper frit form a single surface without offset and likewise the upper side of the lower fitting or ring and the upper side of the lower frit form a single surface without offset whereby both surfaces are parallel.

Generally the smallest inner diameter of the fitting or guide ring or of the upper fitting and of the lower fitting is smaller than the outer diameter of the frit, i.e. the fitting or guide ring extends over the outer perimeter of the frit towards the center of the chromatography column.

The packing of a chromatography column with a chromatography material with a support and/or an embedded chromatography column separator can be split up into two packing phases. The packing can be started with the packing of a first fraction of the chromatography material into the column according to general procedures. Afterwards the support and the chromatography column separator can be placed in and on top of the first fraction of the chromatography material. Finally the second fraction of the chromatography material can be packed into the column on top of the separator according to general procedures. This packing method is a packing from the bottom to the top. In contrast columns not containing a support and a separator are packed from the top requiring among other things higher packing pressure. Thus, the chromatography column support as reported herein provides a means for packing a chromatography column in two sequential steps if one support and one separator are used, or in three or more sequential steps if two or more supports and separators are used. With the support and the separator the column can be divided in an upper chamber and a lower chamber (one support and one separator) or a lower chamber, a middle chamber, and an upper chamber (two supports and two separators) whereof each itself is equivalent to a chromatography column with reduced chromatography material bed height. With the dividing of the chromatography column in smaller chambers the volume (of the chromatography material in one chamber) to surface (of the chamber) ratio is changed, i.e. lowered, and the stability of the chromatography material packing is increased.

The following examples and figures are provided to aid the understanding of the present invention, the true scope of which is set forth in the appended claims. It is understood that modifications can be made in the procedures set forth without departing from the spirit of the invention.

Aspects and Embodiments as Reported Herein

One aspect as reported herein is a chromatography column support comprising
at least one plane of symmetry,
one axis of symmetry,
at least three legs,
at least three straight connectors,
whereby the connectors define a plane that is perpendicular to the axis of symmetry of the support,
whereby the connectors are connected to each other at the axis of symmetry or at a circle around the axis of symmetry,
whereby each leg is connected to a connector,
whereby each leg is perpendicular to the plane defined by the connectors,
whereby all legs are on the same side of the plane defined by the connectors.

One aspect as reported herein is a chromatography column support comprising
one axis of symmetry,
at least one plane of symmetry that is perpendicular to the axis of symmetry,
at least three legs that are perpendicular to the plane of symmetry,
at least three straight connectors,
whereby the connectors define a plane that is perpendicular to the axis of symmetry of the support,
whereby the connectors are connected to each other at or around the axis of symmetry,
whereby each leg is connected to a connector,
whereby each leg is perpendicular to the plane defined by the connectors,
whereby all legs are on the same side of the plane defined by the connectors,
whereby the plane defined by the connectors is not solid.

In one embodiment the connectors are plates.

In one embodiment the legs are plates and the connectors are the upper edge of the respective plate.

In one embodiment at least one of the connectors and one of the legs form a single unit, whereby the legs are plates and the connector is the upper edge of the plate. I.e. the connector is defined by the upper edge of the plate.

In one embodiment each of the connectors forms a single unit with an individual leg.

In one embodiment each of the connectors forms a single unit with a leg. In this embodiment each of the legs forms a single unit with a connector and, thus, the chromatography column support comprises units that are connected to each other at or around the axis of symmetry.

In one embodiment some of the legs are connected to each other at the axis of symmetry of the support.

In one embodiment the plates are perforated plates.

In one embodiment the support comprises additional legs that are not connected to each other at or around the axis of symmetry.

In one embodiment the support comprises one or more circular legs having different radii with respect to the axis of symmetry of the support.

In one embodiment a lateral flow between the sections defined by the legs of the support and the axis of symmetry of the support is possible.

In one embodiment the support comprises three legs and one connector, whereby the connector is Y-shaped and the legs are in form of rods.

In one embodiment the support consists of three legs in form of rods and a Y-shaped connector.

In one embodiment the support consists of three legs in form of plates that are connected to each other at or around the axis of symmetry.

In one embodiment the support consists of four legs in form of rods and an X-shaped connector.

In one embodiment the support consists of four legs in form of plates that are connected to each other at or around the axis of symmetry.

In one embodiment the support consists of six legs in form of rods and an X-shaped connector.

In one embodiment the support consists of six legs in form of plates that are connected to each other at or around the axis of symmetry.

In one embodiment the support consists of
i) four first legs in form of plates that are connected to each other at the axis of symmetry,
ii) four second legs in form of plates that are not connected to each other and to the four first legs at the axis of symmetry, and
iii) three circular legs that are connected to each of the first and second four legs but not to each other and that have different radii with respect to each other and the axis of symmetry.

In one embodiment the plates are perforated plates.

In one embodiment the support comprises at least four legs and at most sixteen legs and comprises four connectors.

In one embodiment the chromatography column support comprises more legs than connectors.

In one embodiment the chromatography column support comprises
at least three legs that each form a unit with a connector,
at least three legs that do not form a unit with a connector,
at least one leg that is a circular leg around the axis of symmetry.

In one embodiment the chromatography column support is a single entity.

In one embodiment the chromatography column support comprises multiple entities.

In one embodiment the connectors have a width of less than 8.0 mm.

In one embodiment the chromatography column support has a diameter of less than 12.5 cm.

In one embodiment the chromatography column support is made of a chromatographically inert material.

In one embodiment the chromatography column support is made of stainless steel, or silicone, or polytetrafluoroethylene, or glass.

One aspect as reported herein is a device comprising
a chromatography column,
at least one movable frit, and
at least one support as reported herein,
wherein the moveable frit and the chromatography column support are inside the chromatography column, and
whereby the moveable fit is above the chromatography column support, when the chromatography column is placed vertically and viewed from the side.

In one embodiment the chromatography column support is freely moveable within the chromatography column.

In one embodiment the chromatography column support in the device as reported herein is within the chromatography column but not affixed to the inner wall of the chromatography column.

One aspect as reported herein is the use of a chromatography column support as reported herein for the stabilization of a chromatography column packing from inside the packing.

One aspect as reported herein is the use of a chromatography column support as reported herein for supporting chromatography material inside a chromatography column.

One aspect as reported herein is the use of a chromatography column support as reported herein for providing an inner structure to a chromatography material in a chromatography column.

One aspect as reported herein is the use of a chromatography column support as reported herein for providing vertical and horizontal support of the chromatography material inside a chromatography column.

One aspect as reported herein is the use of a support as reported herein to stabilize the packing of a chromatography column.

One aspect as reported herein is the use of a chromatography column support comprising perforated plates as combined legs and connectors or comprising plates as legs which comprise longish openings for stabilizing the packing of soft chromatography gels.

One aspect as reported herein is the use of a chromatography column support for adsorbing pressure inside a chromatography column packing.

One aspect as reported herein is the use of a connector comprising circular legs and perforated plates as legs for stabilizing the column packing of large diameter chromatography columns.

One aspect as reported herein is the use of a support as reported herein and a moveable frit to define horizontal sections in a chromatography column.

EXAMPLES

Example 1

Packing of a Chromatography Column Comprising a Support as Reported Herein

During the packing process of columns which are equipped with the flexible bed support elements as reported herein the homogeneous inserting and distribution of the chromatography medium is very important. There are two possibilities to reach a homogeneous packing. The first is to put the flexible bed support element in the column first and inserting the slurry afterwards. In this case the slurry must homogeneously be brought in into the column. The other possibility is bringing in the slurry into the column first, homogenizing it in the column and afterwards introducing the bed support element by putting it directly into the slurry in the column. During the settling a homogeneous column bed forms and encloses the element. After the specified settling time can either an intermediate column frit be put on the bed support element or the column can be locked with an adapter. If an intermediate column frit is used, another flexible bed support element can be put on top and the packing of the next column compartment can be started. The process can be repeated until the complete column height is filled/packed.

Example 2

Chromatographic Separation Using a Conventional Chromatography Column not Comprising a Support as Reported Herein—Cycle Number and Pressure Characteristics for the Use of the Chromatography Material Herein the life cycle of a conventionally packed HPLC column is shown. It can be seen from FIG. 7 that the pressure directly after packing is about 40 bars. This increases after the fortieth regeneration cycle to about 70 bars.

Figure 1A:
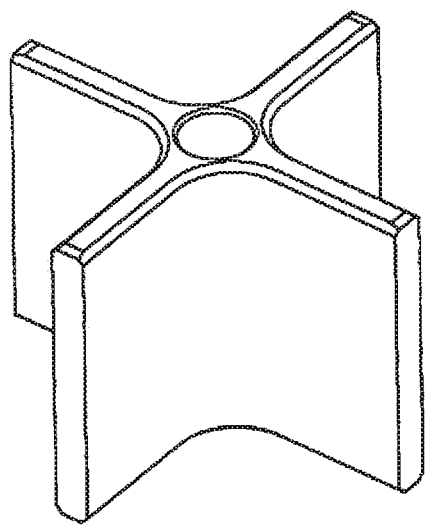
FIGS. 1A and 1B Exemplary embodiments of the support as reported herein: upper: element which has four legs in the form of full areas, these in 90° angles stand to each; lower: element which has six legs.
Figure 1B:
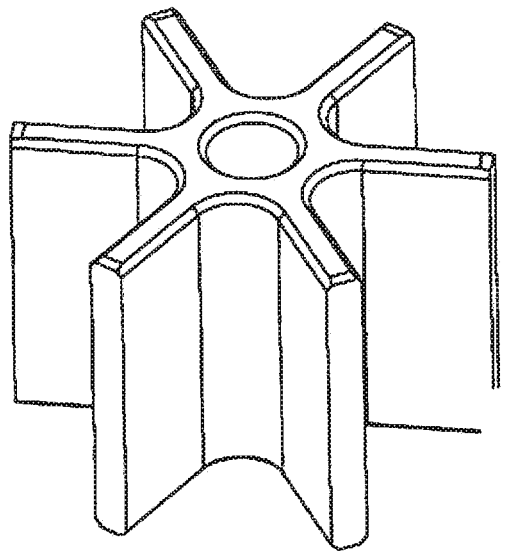
Figure 2A:
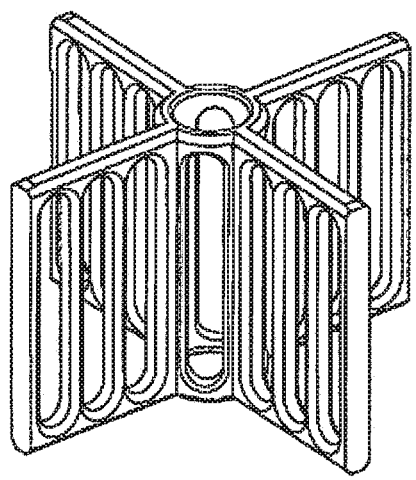
FIGS. 2A, 2B, and 2C Exemplary embodiments of the support as reported herein: upper: element with four legs comprising longish openings in the leg areas; middle: element with round holes in the legs providing crossways networking; lower: element which has three legs inside a chromatography column FIG. 3 Scheme of a chromatographic column comprising several different supports as reported herein and several chromatography column separators.
Figure 2B:
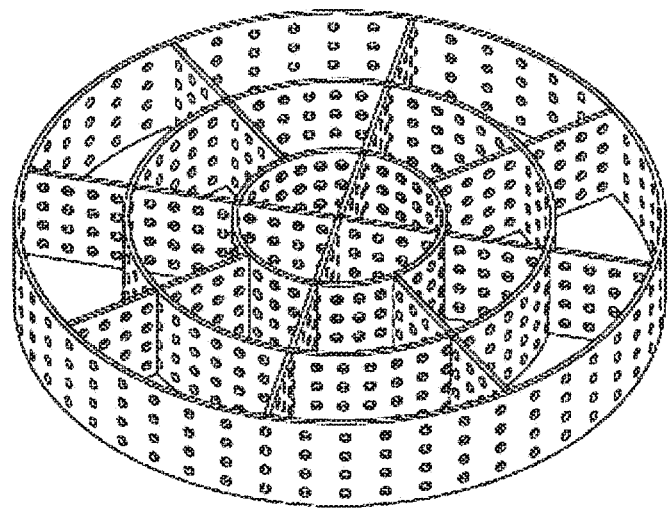
Figure 2C:
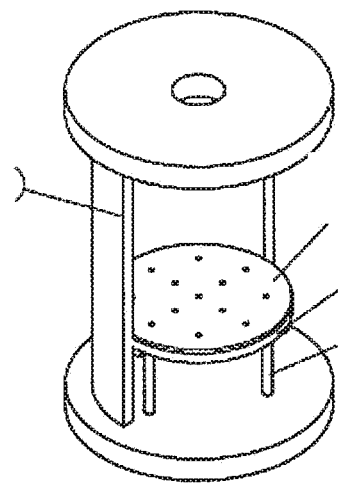
Figure 3:
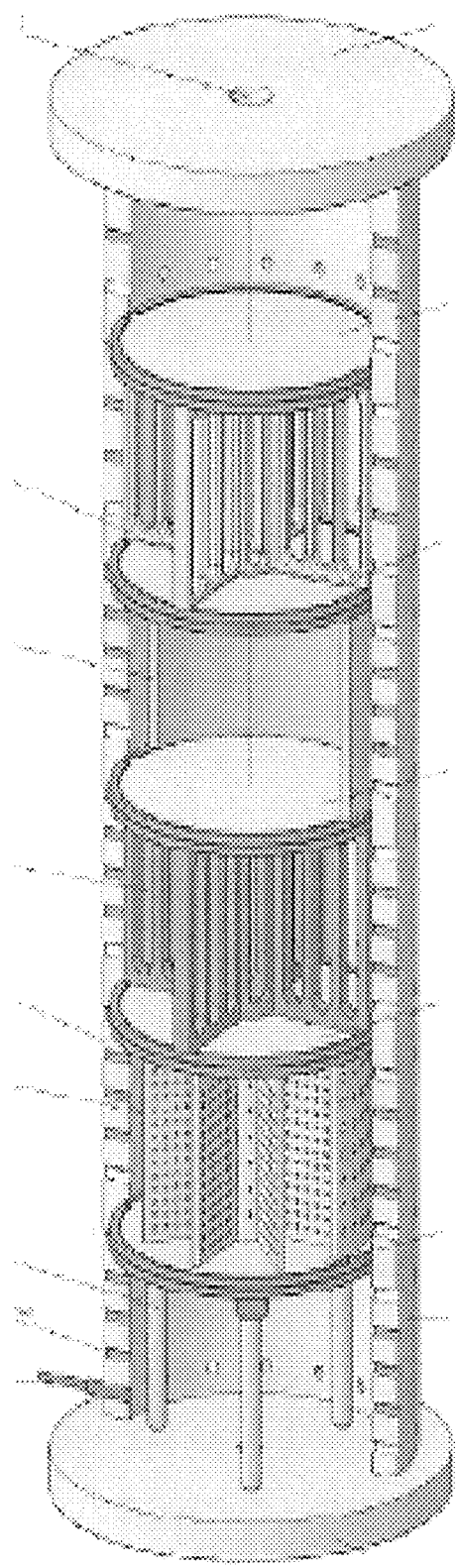
Figure 4:
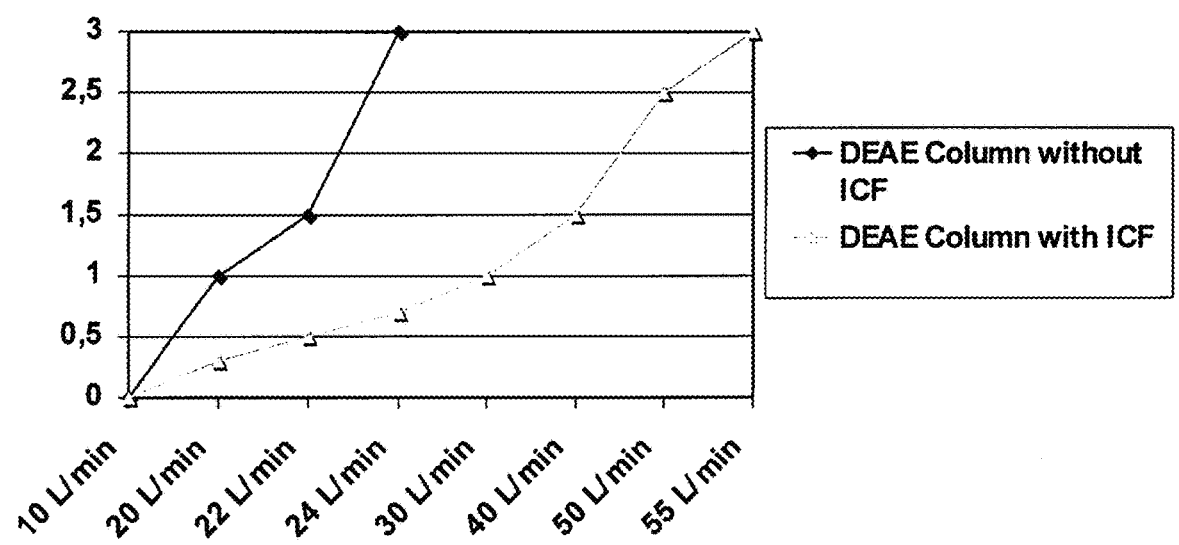
FIG. 4 Flow diagram of a DEAE-Sepharose chromatography column: left curve: column without a support as reported herein; right curve: column with a support as reported herein.
Figure 5:
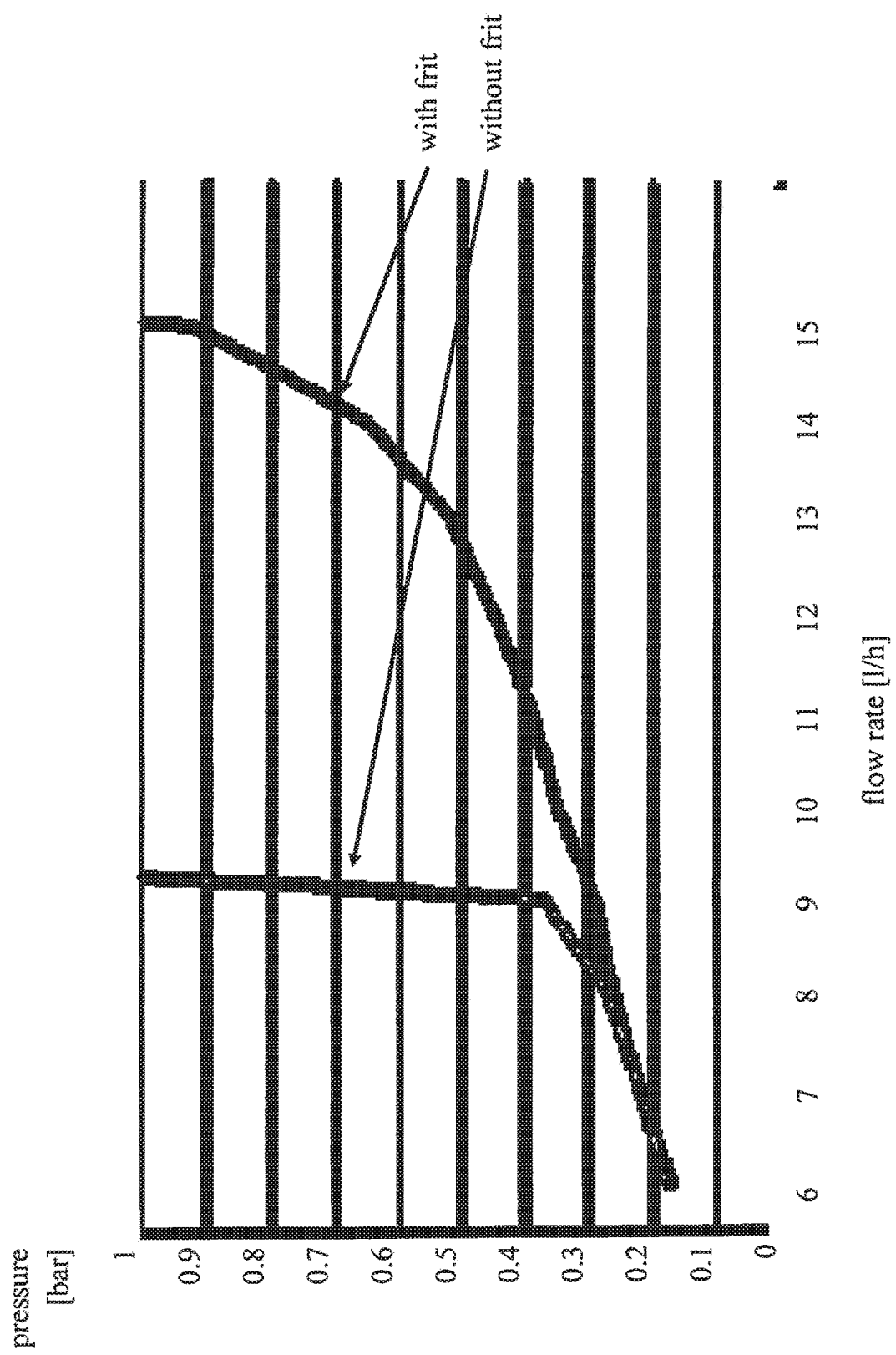
FIG. 5 Flow diagram of a HA-Ultrogel chromatography column: left curve: column without a support as reported herein; right curve: column with a support as reported herein.
Figure 6A:
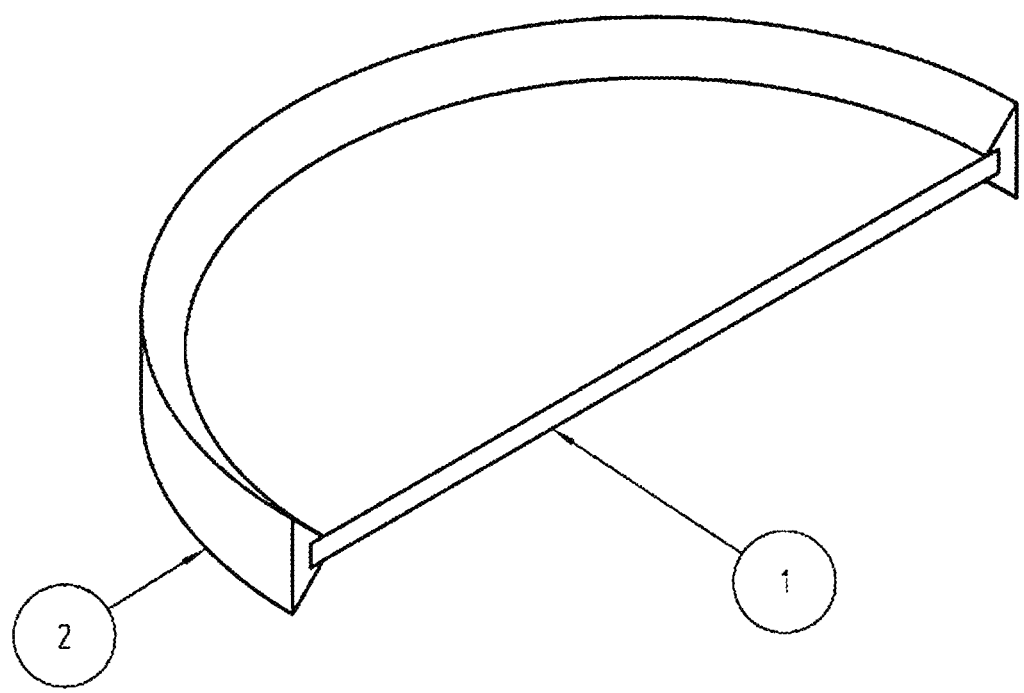
FIG. 6 Exemplary chromatography column separators: a) separator with a single frit comprising a frit (1) and a fitting (2); b) separator with an upper frit (1) and a lower frit (3) and an upper fitting (2) and a lower fitting (4); c) vertical cross-section of the guide ring of the separator comprising two axially symmetric cross-section areas (5 and 6) each having i) a tapering structure, wherein the tapering is from the outside to the inside of the guide ring, and i) a notch (8) with an opening directed to the inside of the guide ring for mounting a frit.
Figure 6B:
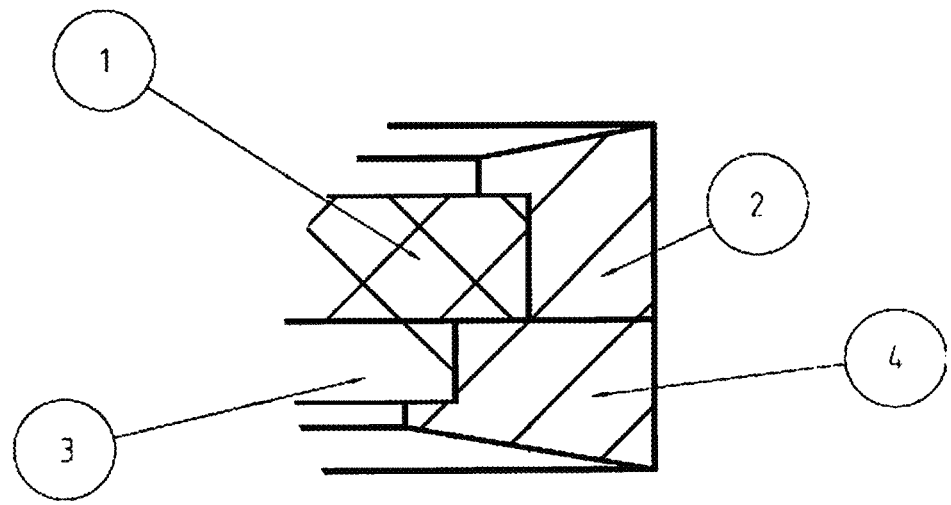
Figure 6C:
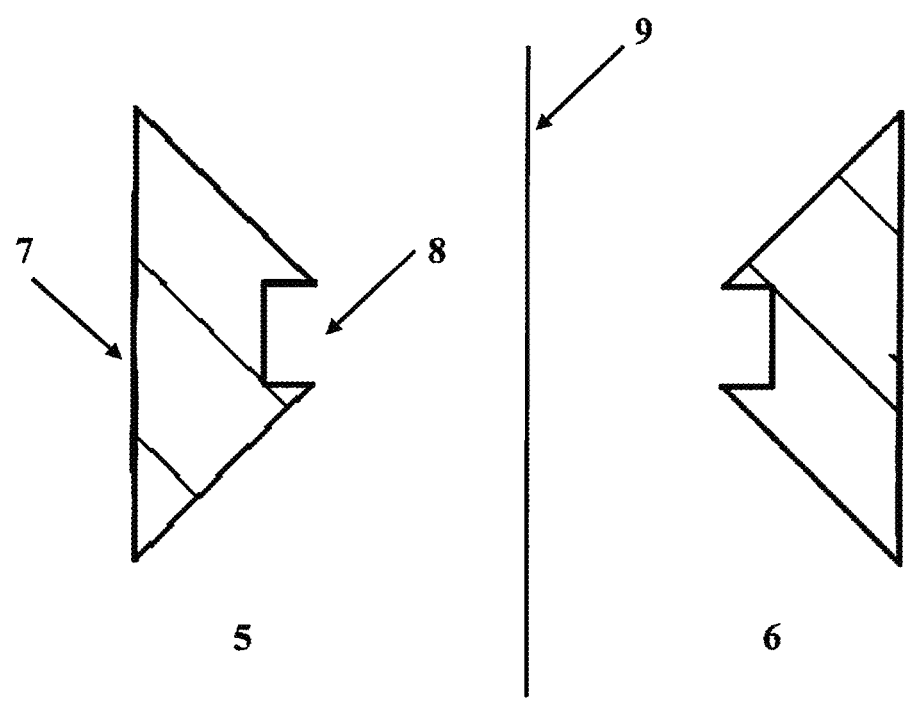
Figure 7:
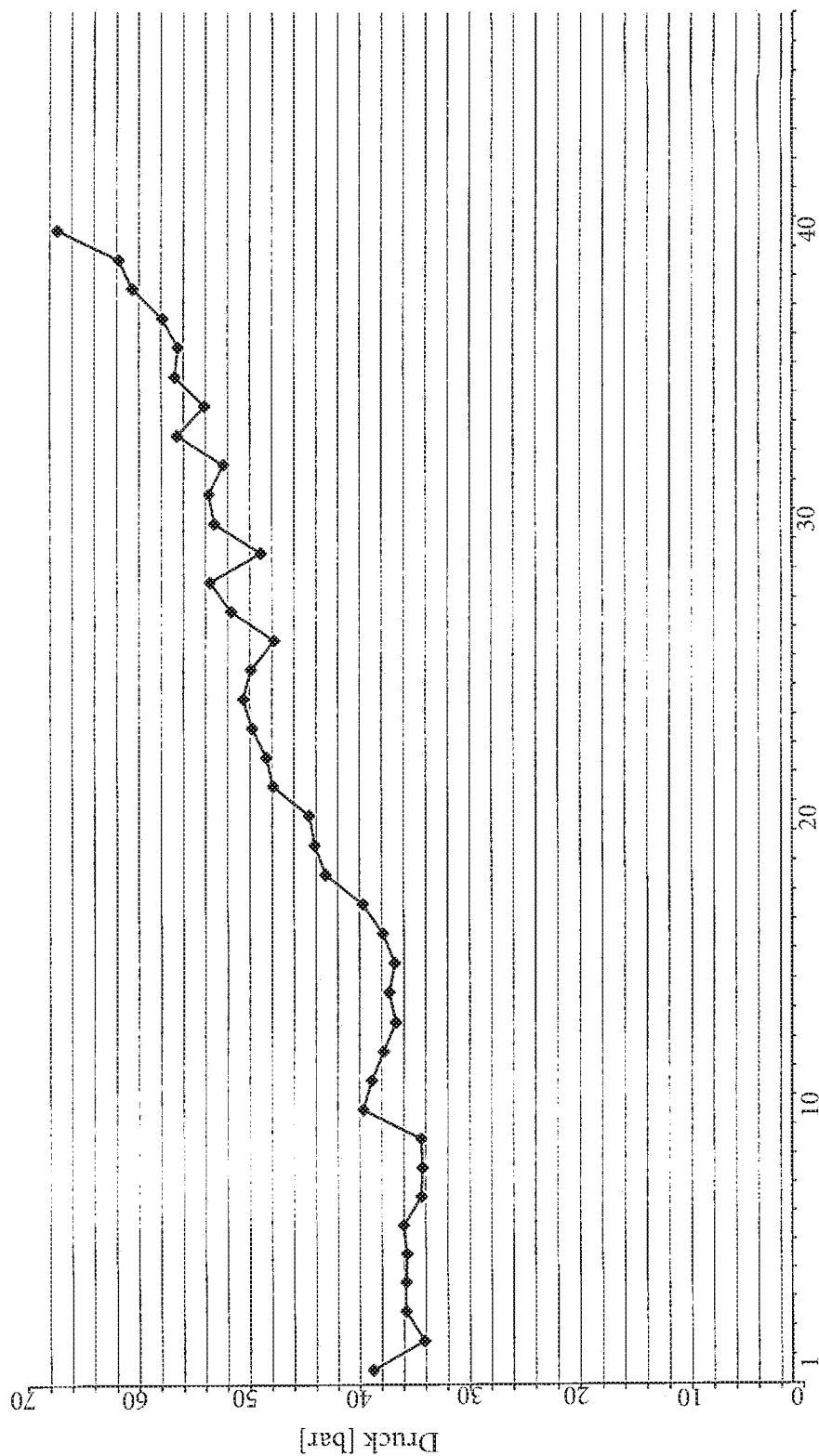
FIG. 7 Pressure values during the regenerations and cycle numbers of a chromatography column not comprising the support as reported herein.

Packing details:
  Column diameter: 30 cm
  Column type: dynamic compression without bed support elements and intermediate column frits
  Bed height: about 40 cm
  Used chromatographic material: Vydac C4
  Flow rate: 162 l/h
  Pressure values during the regenerations and cycle numbers are shown in FIG. 7.

Example 3

Chromatographic Separation Using a Conventional Chromatography Column Comprising a Support as Reported Herein—Cycle Number and Pressure Characteristics for the Use of the Chromatography Material Herein is shown a HPLC column with a support as reported herein and an intermediate column frit. It can be seen that a lower initial pressure after packing compared to the column of Example 2 can be obtained. Altogether a more stable pressure course can be obtained over the use cycles. Also a maximum cycle number of 98 can be reached without the need to repack the column. The intermediate column frit without the support as reported herein fulfills a bed support function at the HPLC media which are compressible only in a very low measure.

Figure 8:
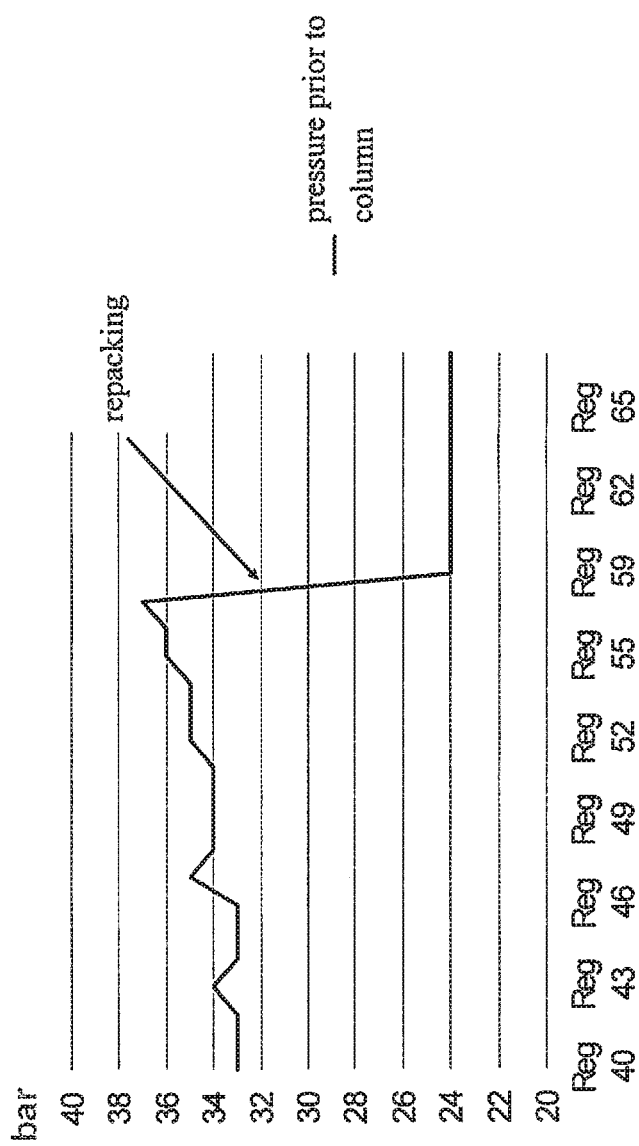
FIG. 8 Pressure values during the regenerations and cycle numbers of a chromatography column comprising the support as reported herein.

Packing Details:
  Column diameter: 15 cm
  Column type: dynamic compression with intermediate column frit
  Bed height: about 40 cm
  Used chromatographic material: Vydac C4
  Flow rate: 35 l/h
  Pressure values during the regenerations and cycle numbers are shown in FIG. 8.

The invention claimed is:

1. A device consisting of
a chromatography column,
the chromatography column comprising an inlet and an outlet,
at least one pair of a movable frit and a chromatography column support,
the chromatography column support comprising
one axis of symmetry,
at least one plane of symmetry comprising the axis of symmetry,
three legs in the form of rods,
one Y-shaped connector,
whereby the Y-shaped connector defines a plane that is perpendicular to the axis of symmetry of the chromatography column support,
whereby each leg is connected to the Y-shaped connector,
whereby each leg is perpendicular to the plane defined by the Y-shaped connector, and
whereby all legs are on the same side of the plane defined by the Y-shaped connector,
wherein the at least one pair of the moveable frit and the chromatography column support is inside the chromatography column,
whereby the moveable frit of each pair is between the inlet and the chromatography column support of the same pair; and
whereby the at least one pair of the moveable frit and the chromatography column support defines horizontal sections in the chromatography column;
wherein the horizontal sections above and below each at least one pair of the movable frit and the chromatography column support are filled with chromatography column packing material; and
wherein the chromatography column support moves along an axis in the flow direction in the chromatography column.

2. A device consisting of
a chromatography column,
the chromatography column comprising an inlet and an outlet,
at least one pair of a movable frit and a chromatography column support,
the chromatography column support comprising
one axis of symmetry,
at least one plane of symmetry comprising the axis of symmetry,
three legs in the form of rods,
one Y-shaped connector,
whereby the Y-shaped connector defines a plane that is perpendicular to the axis of symmetry of the chromatography column support,
whereby each leg is connected to the Y-shaped connector,
whereby each leg is perpendicular to the plane defined by the Y-shaped connector, and
whereby all legs are on the same side of the plane defined by the Y-shaped connector,
wherein the at least one pair of the moveable frit and the chromatography column support is inside the chromatography column, whereby the moveable frit of each pair is between the inlet and the chromatography column support of the same pair; and whereby the at least one pair of the moveable frit and the chromatography column support defines horizontal sections in the chromatography column;

wherein the horizontal sections above and below each at least one pair of the movable frit and the chromatography column support are filled with chromatography column packing material; and wherein the chromatography column support is freely moveable with the chromatography column.

\* \* \* \* \*